United States Patent [19]

Wright et al.

[11] 4,373,648
[45] Feb. 15, 1983

[54] CONTROLLED RATE LINEAR MOTION DRIVE

[75] Inventors: Norbert L. Wright, Park Ridge; Jerome A. Selusnik, Chicago, both of Ill.

[73] Assignee: Teepak, Inc., Chicago, Ill.

[21] Appl. No.: 147,769

[22] Filed: May 8, 1980

[51] Int. Cl.³ .................. A41H 43/00; A22C 11/02
[52] U.S. Cl. .......................... 223/28; 17/42; 223/30
[58] Field of Search ............... 223/28, 30, 31; 74/89, 74/89.17, 89.18, 422, 27, 29; 17/42, 34, 48

[56] References Cited

U.S. PATENT DOCUMENTS

| | | | |
|---|---|---|---|
| 1,361,959 | 12/1920 | Brewer | 223/30 X |
| 1,518,670 | 12/1924 | Noel | 223/30 |
| 2,923,447 | 2/1960 | Ezbelent | 223/30 |
| 3,112,516 | 12/1963 | Bonnee | 17/42 |
| 3,209,398 | 10/1965 | Ziolko | 17/42 |
| 3,454,981 | 7/1969 | Martinek | 17/42 |
| 3,474,662 | 10/1969 | Wilmsen et al. | 17/42 |
| 3,503,093 | 3/1970 | Marbach et al. | 17/42 |
| 3,665,771 | 5/1972 | Blatt | 74/29 |
| 4,068,534 | 1/1978 | Descoteaux et al. | 74/27 |

Primary Examiner—Louis Rimrodt
Attorney, Agent, or Firm—Michael L. Dunn; Paul A. Leipold

[57] ABSTRACT

This relates to a drive mechanism of the rack and pinion type wherein the length of the rack is less than the required travel and there are plural drive pinions which singly and then sequentially engage the rack. The drive pinions may be driven in any manner, but when a variation in speed is desired in addition to reciprocation, it has been found that a cam type drive will provide the desired mechanical movement. The rack may be beneficially used to effect the controlled movement of a shirred casing strand along a mandrel.

7 Claims, 7 Drawing Figures

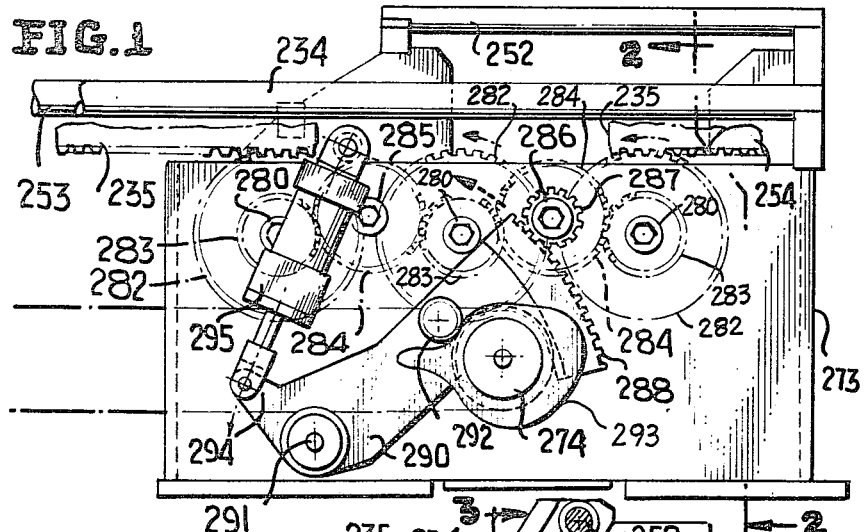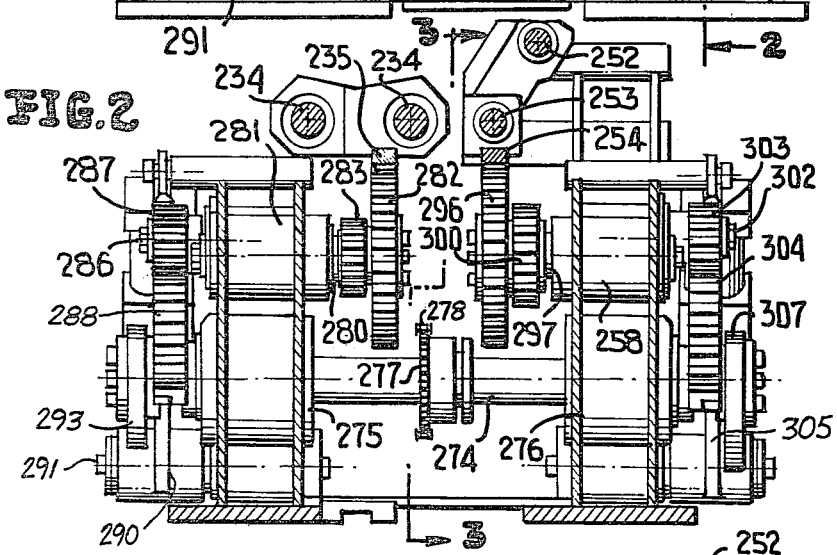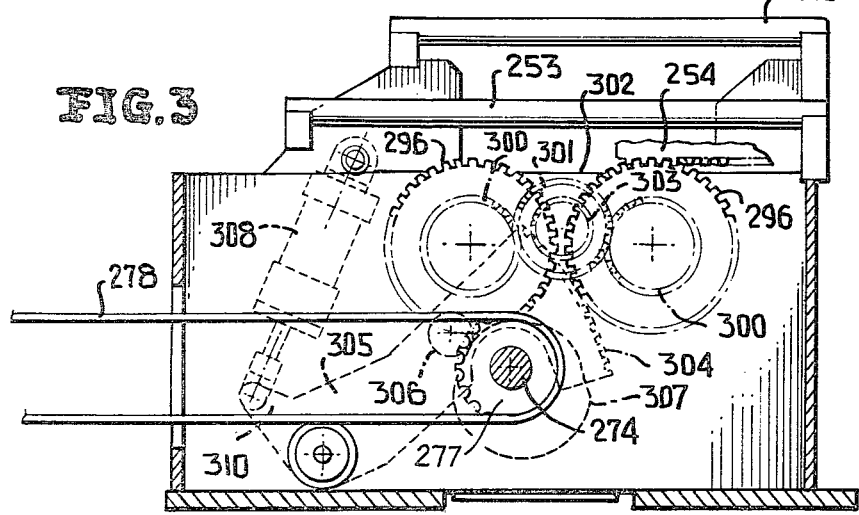

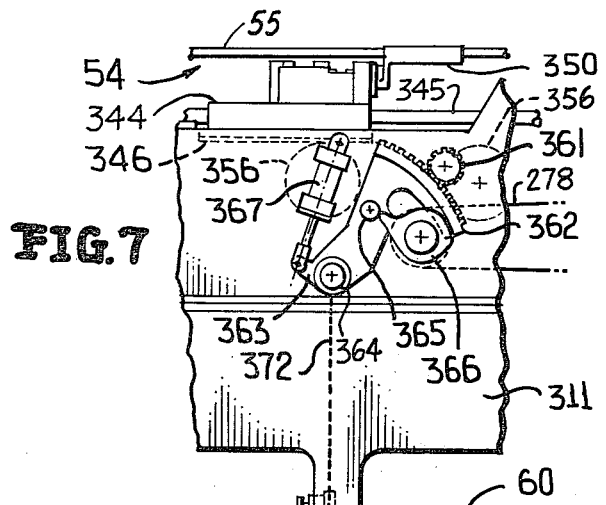
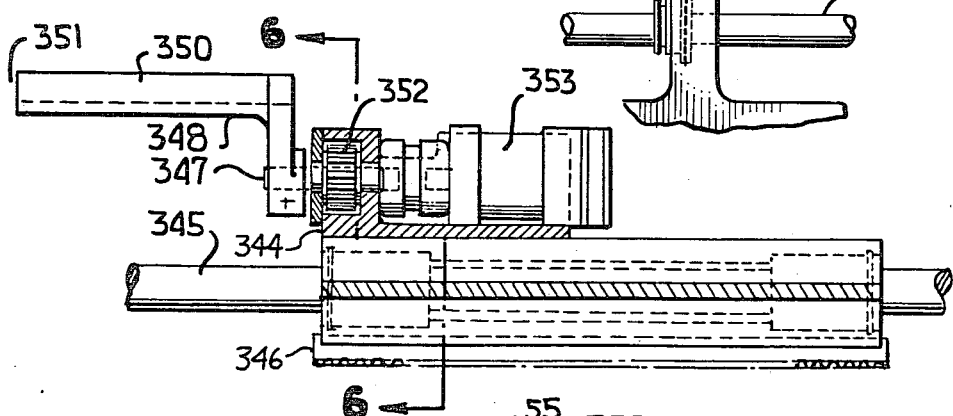
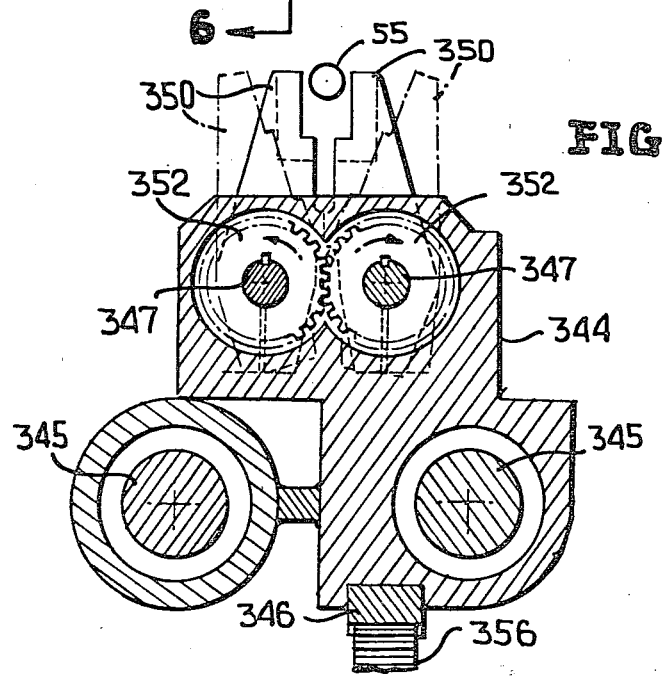

CONTROLLED RATE LINEAR MOTION DRIVE

This invention relates to a controlled rate linear motion drive which is operative to effect reciprocation of a member at varying linear rates.

Most specifically, this invention relates to a drive mechanism which includes a rack mounted for guided movement along a predetermined path first in one direction and then the other. The movement of the rack is controlled by a cam which, in accordance with its configuration, both effects the reciprocation of the rack and the speed of the rack.

Another feature of the invention is the provision of a rack and pinion type drive wherein the available length of the rack is much less than the required travel of the rack with the result that there are provided plural pinions engageable in sequence and at times simultaneously with the rack wherein the rack is first fed by one pinion, then by two pinions, and next by the second of the two pinions.

The drive mechanism, while it has universal usage, is particularly adapted for feeding a carrier device along a predetermined linear path and a particular usage is the advancement of a shirred casing strand along a mandrel.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a side elevational view of the base portion of a strand separator, and generally shows the details of the drive mechanisms for reciprocating units thereof in sequence, the details of one drive mechanism being specifically illustrated.

FIG. 2 is a transverse vertical sectional view taken generally along the line 2—2 of FIG. 1, and shows more specifically the details of the drive mechanism.

FIG. 3 is a longitudinal vertical sectional view taken along the line 3—3 of FIG. 2, and shows the specific details of the drive mechanism for the other unit.

FIG. 5 is a fragmentary longitudinal vertical sectional view taken generally along the line 5—5 of FIG. 4, and shows generally the details of one-half of the hold back device.

FIG. 6 is a fragmentary transverse vertical sectional view taken generally along the line 6—6 of FIG. 5, and shows further the details of the hold back device.

FIG. 7 is a fragmentary side elevational view of the hold back device.

Figure 4:
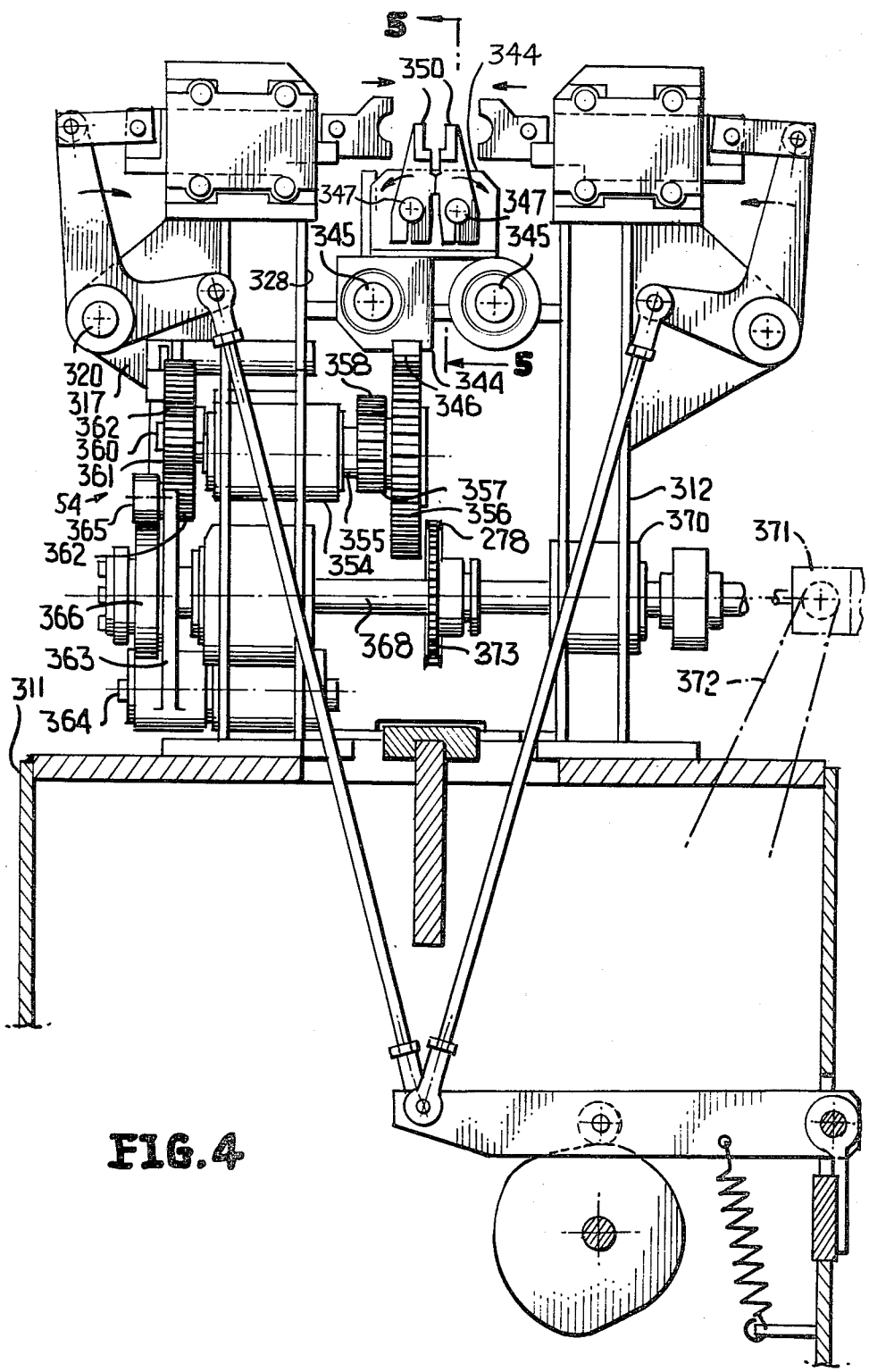
FIG. 4 is an enlarged fragmentary vertical sectional view showing generally the details of the mounting of mandrel supports and a hold back device.

It is to be understood that a combined casing hold back and separator unit is mounted on a rigid base which carries a machinery housing 273. Guide rods 234, 252 and 253 for the unit are suitably mounted on the machinery housing 273 by means of suitable brackets which in and of themselves form no part of this invention.

Within the machinery housing 273 are separate drive systems for effecting the reciprocation of racks 235 and 254. These two drive systems are of a similar nature but will be separately described.

First of all, these is a common drive shaft 274 for the two drive systems, the shaft 274 extending transversely of the machinery housing and being suitably journalled within bearings 275, 276 mounted therein. The drive shaft 274 carries a sprocket 277 which is driven by a drive chain 278 the details of which will be set forth hereinafter.

The drive system for the rack 235 includes a plurality of shafts 280 which are mounted within bearings 281. Each shaft 280 carries a pinion 282 which is in position to be meshed with the associated rack 235. At this time it is pointed out that the mounting of each pinion 282 relative to the shaft 280 is one wherein the pinion may be angularly adjusted relative to the shaft.

Each shaft 280 also carries a drive pinion 283. As is best shown in FIG. 1, the drive pinions 283 are spaced and are drivingly interconnected by intermediate pinions 284 which are carried on stub shafts 285 and 286. Thus, all of the pinions 282 are rotated in unison. As is apparent from FIG. 1, the length of the rack 235 is much shorter than the stroke or linear movement thereof. Thus, the rack 235, as it shifts longitudinally of the machine housing 273 from its left position to its right position (as viewed in FIG. 1), is sequentially engaged by the pinions 282 to have a very long effective stroke. The stroke of the rack 235 is greatly in excess of its length and this stroke is made possible by the plurality of pinions 282 and the mounting thereof so that they are in adjusted coordinated relation with respect to the rack so that there is no binding even when the rack is engaged simultaneously by two pinions 282.

The pinions 282 are driven through the shaft 286 and the intermediate gear 284 carried thereby. The shaft 286 extends to the exterior of the machine housing 273 and has mounted thereon a drive pinion 287 which is engaged by a drive rack 288. The drive rack 288 is carried by an elongated arm 290 which is mounted on a pivot shaft 291 for oscillation.

The arm 290 carries a cam follower 292 which engages a cam 293 carried by one end of the shaft 274. In order that the cam follower 292 may be constantly engaged with the cam, the arm 290 is in the form of a crank and has a second arm 294 to which there is connected an extensible fluid motor 295 which constantly urges the cam follower 292 against the cam 293 under a controlled pressure.

It is to be understood that for each complete rotation of the cam 293 there is a complete reciprocatory cycle of the rack 235 and that the shape of the cam 293 not only varies the direction of the rack movement but also rack speed.

The second drive system, which controls the position of the rack 254, is similar to the drive system for the rack 235 but differs therefrom primarily in that there are only two pinions 296. The pinions 296 are mounted on stub shafts 297 carried by bearings 258. Each shaft 297 also carries a drive pinion 300. It is to be understood that the pinions 296 are angularly adjustably mounted on their respective shafts 297.

With reference to FIG. 3, it will be seen that the drive pinions 300 are drivingly interconnected by an intermediate gear 301 which is carried by a stub shaft 302. The stub shaft 302 extends externally of the machine housing 273 and carries a drive gear 303 which is meshed with a arcuate rack 304. The rack 304 is carried by one arm 305 of a crank arrangement. The arm 305 carries a cam follower 306 which engages a cam 307 carried by the shaft 274. The arm 305 is constantly urged toward the cam 307 by way of an extensible fluid motor 308 engaged with a second arm 310 of the lever arrangement of which the arm 305 is a part.

It is to be understood that the rack 254 is also relatively short as compared to the desired stroke thereof and that it is transferred from one pinion 296 to the other with there being an intermediate position where the rack 254 is being simultaneously driven by both pinions 296. It is also to be understood that the complete reciprocatory cycle of the rack 254 is effected in a single revolution of the cam 307 and that the shape of the cam 307 varies the direction and rate of movement of the rack 254, The machinery frame includes a heavy base 311 which is positioned next to the base on which the housing 273 is mounted. The base 311 has extending upwardly therefrom a pair of supports 312 and 238.

In FIGS. 4–7 there are illustrated the details of a hold back device 54. The hold back device 54 includes a carrier 344 which is mounted for reciprocation on a pair of guide rods 345 which are supported by way of suitable brackets carried by the supports 312 and 328. The carrier 344 has affixed to the underside thereof a rack 346 to effect the reciprocation thereof along the guide rods 345.

The carrier 344 has two longitudinally extending, transversely spaced shafts 347 mounted therein for rotation. Each shaft 347 carries a generally L-shaped mounting bracket 348 including an elongated, generally L-shaped arm 350 which is configured to be disposed closely adjacent to the mandrel 55 and hold back the leading end of a shirred casing.

The shafts 347 carry meshing pinions 352 so that the shafts may be oscillated in unison to move the arms 350 together and apart as is shown in FIG. 6. One of the shafts 347 has a rotary drive member 353 coupled thereto for effecting the timed pivoting of the arms 350.

Referring now to FIGS. 4 and 7, it will be seen that the rack 346 is much shorter than its length of travel. In order to drive the rack 346 through a distance in excess of its length, there is carried by one of the supports 312, 328 which is in the form of one side of a machine housing, suitable bearing assemblies 354 which carry stub shafts 355. Each stub shaft carries a pinion 356 which is meshed with the rack 346. It is to be understood that the relationship of the pinions 356 is such that two of the pinions may simultaneously mesh with and drive the rack 346 without binding.

There is also fixed to each stub shaft 355 a drive pinion 357 with adjacent drive pinions being meshed with intermediate pinions 358 in the manner previously illustrated and described with respect to FIGS. 1 and 3; so that all of the pinions 356 are driven in unison. It is therefore deemed unnecessary to duplicate the illustration of these intermediate pinions 358 in the schematic view of FIG. 7. One of the intermediate pinions 358 is carried by a shaft 360 which carries a drive pinion 361 which is meshed with an arcuate rack 362. The rack 362 is carried by an arm 363 which is mounted on a pivot shaft 364 and which has a cam follower 365 which engages a cam 366. The cam follower is held against the cam under pressure by a suitable pressure applying device 367 such as a fluid cylinder.

The cam 366 is carried by a shaft 368 which extends transversely of the machine and is rotatably journalled in suitable bearings 370 carried by the sides of the machinery housing which extend from the supports 312. The shaft 368 at the end remote from the cam 366 is coupled to a reduction gear unit 371 which is driven from the control shaft 60 by a drive connection 372.

The shaft 368, intermediate its ends, is provided with a drive sprocket 373 for the chain 278.

It is to be understood that the hold back device 54, when used, will engage the leading end of shirred casing and serve to maintain the controlled density thereof.

What is claimed as new is:

1. In a drive mechanism for converting rotational movement to linear movement, said drive mechanism being of the rack and pinion type wherein the available rack length is less than that required for its intended stroke, the improvement comprising:
   a rack linearly movable from one extreme position to another extreme position; and
   at least two spaced pinions disposed in substantially coplanar relationship for mating engagement with said rack, said pinions being movable in synchronized relationship with each other;
   the length of said rack and the spacing of said pinions being such that when said rack is in either of said extreme positions the same mates with only one of said pinions whereas, when said rack is in a position therebetween the same simultaneously mates with two of said pinions.

2. The drive mechanism of claim 1, wherein:
   each of said pinions are mounted for rotation on a driven shaft and are angularly adjustable with respect to said shaft whereby movement of said rack into its position of simultaneous engagement with two of said pinions is free of binding.

3. The drive mechanism of claim 1 wherein each of said pinions is mounted on a driven shaft for rotation, drive means coupled to said driven shafts for driving said driven shafts in unison, said drive means including an oscillating drive shaft wherein said pinions are first driven in one direction and then in a reverse direction for effecting controlled reciprocation of said rack.

4. The drive mechanism of claim 3 wherein said drive means includes a control shaft rotating in a single direction, a drive cam carried by said control shaft for rotation therewith, and follower means carried by said oscillating drive shaft engaging said cam.

5. The drive mechanism of claim 1 wherein said drive mechanism is part of a shirring machine and said rack carries a hold back device guided relative to a mandrel.

6. The drive mechanism of claim 5 wherein said hold back device includes two arms for positioning on opposite sides of said mandrel, and means for selectively separating said arms to permit a shirred casing strand to pass said hold back device.

7. The drive mechanism of claim 6 wherein said arms are mounted on first shafts carrying meshed gears, and said means for selectively separating said arms includes motor means for rotating one of said shafts.

* * * * *